United States Patent
Ahad et al.

(10) Patent No.: US 8,292,224 B1
(45) Date of Patent: Oct. 23, 2012

(54) QUICK INSTALL AIRCRAFT TRACK FITTING DEVICE

(75) Inventors: Sam J. Ahad, Newhall, CA (US); Miguel Angel Alvarez-Torres, San Fernando, CA (US)

(73) Assignee: TIMCO Aviation Services, Inc., Greensboro, NC (US)

( * ) Notice: Subject to any disclaimer, the term of this patent is extended or adjusted under 35 U.S.C. 154(b) by 731 days.

(21) Appl. No.: 12/354,567

(22) Filed: Jan. 15, 2009

(51) Int. Cl.
*B64D 13/00* (2006.01)
*A47C 1/00* (2006.01)
*A47B 97/00* (2006.01)
*B61D 45/00* (2006.01)

(52) U.S. Cl. ............... 244/118.6; 297/344.1; 248/503.1; 410/104

(58) Field of Classification Search ............. 244/122 R, 244/118.6, 131, 118.5; 248/503, 503.1, 500, 248/501; 297/463.1, 344.1; 410/105, 101, 410/104
See application file for complete search history.

(56) References Cited

U.S. PATENT DOCUMENTS

| | | | | |
|---|---|---|---|---|
| 2,523,960 A | 9/1950 | Liljengren | | 297/43 |
| 2,606,727 A | 8/1952 | De Haven | | 244/118.6 |
| 2,861,624 A | 11/1958 | Anderson | | 297/43 |
| 3,102,754 A | 9/1963 | Junkunc | | 297/162 |
| 3,145,052 A | 8/1964 | Morgan | | 297/354 |
| 3,392,954 A | 7/1968 | Malitte | | 248/429 |
| 3,730,019 A | 5/1973 | Ballard | | 74/502 |
| 4,105,177 A | 8/1978 | Smith et al. | | 248/564 |
| 4,109,891 A * | 8/1978 | Grendahl | | 248/503.1 |
| 4,215,841 A | 8/1980 | Herring, Jr. | | 248/635 |
| 4,354,398 A | 10/1982 | Porter | | 74/501 |
| 4,376,522 A | 3/1983 | Banks | | 248/503.1 |
| 4,449,875 A * | 5/1984 | Brunelle | | 410/80 |
| 4,498,649 A | 2/1985 | Toll | | 244/118.6 |
| 4,509,888 A | 4/1985 | Sheek | | 410/105 |
| 4,634,182 A | 1/1987 | Tanaka | | 297/379 |
| 4,662,676 A | 5/1987 | Havelock | | 297/194 |
| 4,723,732 A | 2/1988 | Gorges | | 244/118.6 |
| 4,771,969 A | 9/1988 | Dowd | | 244/118.6 |
| 4,776,533 A | 10/1988 | Sheek et al. | | 244/118.6 |
| 4,796,837 A | 1/1989 | Dowd | | 244/122 R |
| 4,856,738 A | 8/1989 | Martin | | 244/122 R |
| 4,887,864 A | 12/1989 | Ashton | | 297/375 |
| 4,932,816 A | 6/1990 | Ligensa | | 410/105 |
| 4,944,552 A | 7/1990 | Harris | | 297/145 |

(Continued)

*Primary Examiner* — Milton Nelson, Jr.
(74) *Attorney, Agent, or Firm* — MacCord Mason PLLC

(57) ABSTRACT

An improved seating apparatus for an aircraft includes a seat assembly and a quick install track fitting assembly for securing the seat assembly to the aircraft. In a preferred embodiment, the quick install track fitting assembly is made up of a track fitting body for insertion into an aircraft seat track and a manual lever that is pivotably attached to the track fitting body. The manual lever has a lever release position and a lever lock position. A force bearing plunger is movably attached to the manual lever for transferring force to the aircraft seat track. The force bearing plunger has a track release position and a track lock position, wherein both positions correspond to the lever release and lever lock positions of the manual lever. A lock may also be provided for maintaining the plunger in the track lock position when the manual lever is in the lever lock position. The quick install aircraft track fitting may further include a spring loaded secondary plunger to help locate and provide a secondary lock for securing the seat assembly into a proper position within the aircraft seat track. Moreover, the quick install track fitting may further include an anti-rattle feature that urges the force bearing plunger against the top of the seat track.

52 Claims, 5 Drawing Sheets

U.S. PATENT DOCUMENTS

| | | | | |
|---|---|---|---|---|
| 5,029,822 | A | 7/1991 | Selzer | 267/64.12 |
| 5,083,726 | A | 1/1992 | Schurr | 244/118.6 |
| 5,169,091 | A | 12/1992 | Beroth | 244/122 R |
| 5,178,346 | A | 1/1993 | Beroth | 244/122 R |
| 5,180,120 | A | 1/1993 | Simpson et al. | 244/118.6 |
| 5,193,765 | A | 3/1993 | Simpson et al. | 244/118.6 |
| 5,284,379 | A | 2/1994 | Arnold et al. | 297/113 |
| 5,333,818 | A | 8/1994 | Brandt et al. | 244/118.6 |
| 5,337,979 | A | 8/1994 | Bales et al. | 244/118.1 |
| 5,383,630 | A | 1/1995 | Flatten | 244/118.6 |
| 5,425,516 | A | 6/1995 | Daines | 244/118.6 |
| 5,451,092 | A | 9/1995 | Gray | 297/122 |
| 5,553,923 | A | 9/1996 | Bilezikjian | 297/452.2 |
| 5,558,391 | A | 9/1996 | Chavous | 297/153 |
| 5,651,587 | A | 7/1997 | Kodaverdian | 297/423.36 |
| 5,722,722 | A | 3/1998 | Massara | 297/216.13 |
| 5,765,911 | A | 6/1998 | Sorenson | 297/173 |
| 5,794,470 | A | 8/1998 | Stringer | 70/261 |
| 5,806,932 | A | 9/1998 | Zhuang | 297/361.1 |
| 5,810,290 | A | 9/1998 | Merensky et al. | 244/118.6 |
| 5,871,259 | A | 2/1999 | Gehart | 297/362.12 |
| 5,890,765 | A | 4/1999 | LaPointe et al. | 297/354.13 |
| 5,992,798 | A | 11/1999 | Ferry | 244/118.6 |
| 6,003,394 | A | 12/1999 | Heckel, Jr. | 74/89.15 |
| 6,019,429 | A | 2/2000 | Tedesco | 297/328 |
| 6,086,155 | A | 7/2000 | Stiffler | 297/362 |
| 6,106,067 | A | 8/2000 | Zhuang et al. | 297/361.1 |
| 6,119,980 | A | 9/2000 | Ferry | 244/122 R |
| 6,176,547 | B1 | 1/2001 | Fran.cedilla.ois et al. | 297/257 |
| 6,260,813 | B1 | 7/2001 | Whitcomb | 248/503.1 |
| 6,279,416 | B1 | 8/2001 | Bucholtz et al. | 74/501.5 |
| 6,601,798 | B2 | 8/2003 | Cawley | 244/118.6 |
| 6,669,295 | B2 | 12/2003 | Williamson | 297/362.13 |
| 6,793,282 | B2 | 9/2004 | Plant et al. | 297/248 |
| 6,799,805 | B2 | 10/2004 | Johnson | 297/452.2 |
| 6,902,365 | B1 | 6/2005 | Dowty | 410/105 |
| 7,066,551 | B2 | 6/2006 | Johnson | 297/452.18 |
| 2004/0145225 | A1 | 7/2004 | Alter | 297/367 |
| 2005/0133666 | A1 | 6/2005 | Zerner | 244/118.6 |
| 2006/0091707 | A1 | 5/2006 | Ahad | 297/145 |
| 2006/0102784 | A1 | 5/2006 | Callahan et al. | 244/118.6 |
| 2006/0104740 | A1* | 5/2006 | Girardin et al. | 410/105 |
| 2007/0232101 | A1* | 10/2007 | Hudson | 439/157 |

* cited by examiner

QUICK INSTALL AIRCRAFT TRACK FITTING DEVICE

CROSS-REFERENCES TO RELATED PATENTS AND APPLICATIONS

The present application is related to, and hereby incorporates by reference in their entirety, the disclosures of the following commonly owned and assigned patents and patent applications: (i) U.S. patent application Ser. No. 12/273,929 filed Nov. 19, 2008 entitled "Cushion-less Aircraft Seat"; (ii) U.S. patent application Ser. No. 10/973,829 filed Oct. 26, 2004 and now U.S. Pat. No. 7,232,096 issued Jun. 19, 2007 entitled "Positive Lock Seat Device"; (iii) U.S. patent application Ser. No. 10/883,580 filed Jul. 1, 2004 and now U.S. Pat. No. 7,410,127 issued Aug. 28, 2007 entitled "Seat Track Anti-rattle Locking Device"; (iv) U.S. patent application Ser. No. 10/979,538 filed Nov. 2, 2004 and now U.S. Pat. No. 7,261,369 issued Aug. 28, 2007 entitled "Convertible Aircraft Passenger Seat".

BACKGROUND (1) Technical Field

The present inventions relate generally to an improved seating apparatus for an aircraft and, more particularly, to a quick install aircraft track fitting device for securing a seat assembly to an aircraft.

(2) Related Art

Traditionally, the rear seat track locking device for a seating apparatus for a commercial aircraft consisted of a threaded locking screw, a conventional lock washer, a shear plunger, and a track fitting. A locking ring to retain the screw and a spring may have been installed inside the plunger. When the screw was tightened, it was drawn into the track fitting. This engaged the shear plunger with a floor mounting track and force crescent-shaped ears on the bottom of a track fitting up against the floor mounting track, holding the seating apparatus in place.

One of the problems with such a traditional seat track locking device is that if the screw was not properly tightened, the lock washer may not have been engaged with the screw. This would allow the screw to turn and loosen, which caused the fitting to become loose in the floor mounting track. Furthermore, traditional track locking devices require tools such as wrenches and/or screwdrivers to tighten bolts or screws that hold the track fitting onto the track. The traditional track fitting requires the installer to bend down to the floor level to align the shear plunger with the track hole, then engage the plunger and tighten the screw to a specified torque value. This traditional procedure is both uncomfortable and time consuming for the installer. Thus, there remains a need for a quick install aircraft track fitting assembly for securing a seat assembly to an aircraft. The quick install aircraft track fitting device should include a means for tightening the track fitting to the track without the need for tools such as a wrench and/or screwdriver.

SUMMARY

The present inventions are directed to an improved seating apparatus for an aircraft comprising a seat assembly, and a quick install aircraft track fitting for securing the seat assembly to the aircraft. In one embodiment, the quick install aircraft track fitting assembly includes a track fitting body for insertion into an aircraft track and a manual lever that is pivotably attached to the track fitting body. The manual lever has a lever release position and a lever lock position. A force-bearing plunger is movably attached to the manual lever for transferring force to the aircraft seat track. The force-bearing plunger has a track release position and a track lock position, wherein both positions correspond to the lever release and lever lock positions of the manual lever. A locking means is also provided for maintaining the plunger in the track lock position when the manual lever is in the lever lock position. Also in the preferred embodiment, the seat assembly includes a seat leg to which the quick install aircraft track fitting assembly is attached.

In an embodiment of the invention, the apparatus may further include a seat track for engaging the track fitting body. The track may include a top, bottom and at least one side defining a slot for retaining the track fitting body. The top of the track may include opposing edges generally parallel to the sides of the track. The distance between the opposing edges may change along at least a portion of the track.

In an embodiment of the invention, the track fitting assembly extends trackwardly from the seat assembly. The fitting may include a head portion and a collar portion. The head portion of the fitting may be larger than the collar portion of the track fitting body, which is measured transverse to the trackward extension of the track fitting body.

In an embodiment, the apparatus may further include a locking means comprising a locking ball and a locking piston having a compression spring. A generally vertical cylinder piston wall defines a cavity within a rearward portion of the track fitting body. This cavity houses the piston spring and the locking piston. The compression spring may be retained beneath the locking piston via a bottom cap.

The locking piston may have a reduced diameter head portion that includes a lock indicator flag. A uniform shoulder may exist between the reduced diameter head portion and remainder of the locking piston. The shoulder may have a slight downward and outwardly radial slope.

The rear section of the track fitting body may include a flag indicator port centered above the locking piston. The manual lever may also have a flag indicator port that aligns with the track fitting body flag indicator port when the lever is in a lever lock position, thus making the indicator flag visible through the indicator ports.

A tunnel for the locking ball may extend from a forward facing outer surface of the rear section of the track fitting body into and through the vertical cylindrical piston wall. When the lever is in a lever release position, the locking ball rests both against the shoulder of the locking piston and against a tip of a locking plate carried by and extending downwardly from the lever. In this way, the locking ball is partially within the tunnel and partially against the locking piston shoulder pressing downwardly on the piston and compression spring such that the indicator flag is retracted from view. In contrast, when the lever is in the lock lever position, the locking ball rests within a detent on the locking plate allowing the compression piston spring to push the locking piston upward such that the indicator flag is visible through the indicator flag ports. It is preferred for the tunnel to extend all the way through to the outside of the track body fitting rear section, such that a small diameter tool may be inserted into the tunnel from the outside to depress the piston from its shoulder to allow the locking ball to roll back on the piston shoulder. In this way, the locking ball is free from the detent, thereby allowing the compression release spring to push force-bearing plunger and lever to their release positions.

A secondary plunger may attach to the rear section of the track fitting body by way of tongue and groove tracks together with tongue sliders that are slidable within the tongue and groove tracks. The tongue and groove tracks may be arranged on opposite sides of the rear section of the track fitting body. A secondary locking ball may fit within a second tunnel that may extend through the secondary plunger. The secondary locking ball may be urged against the rear section of track fitting body by a locking ball compression spring, which in turn may be held within the second tunnel by a detent adjustment screw. A secondary detent may be included for engaging the secondary locking ball. The detent may be located in an upper portion of the rear section. The secondary plunger may be downwardly biased by a secondary compression spring, which in turn may be held against the track fitting body by a retainer bracket that may be fastened to the secondary plunger by a fastener. The secondary plunger acts as a position locator at the seat track. When depressed, the spring loaded plunger drops into the nearest track hole. This will allow the main shear plunger to line-up with the seat track and be ready to engage the seat track.

These and other aspects of the present inventions will become apparent to those skilled in the art after a reading of the following description of the preferred embodiment when considered with the drawings.

DESCRIPTION OF THE PREFERRED EMBODIMENTS

Figure 1:
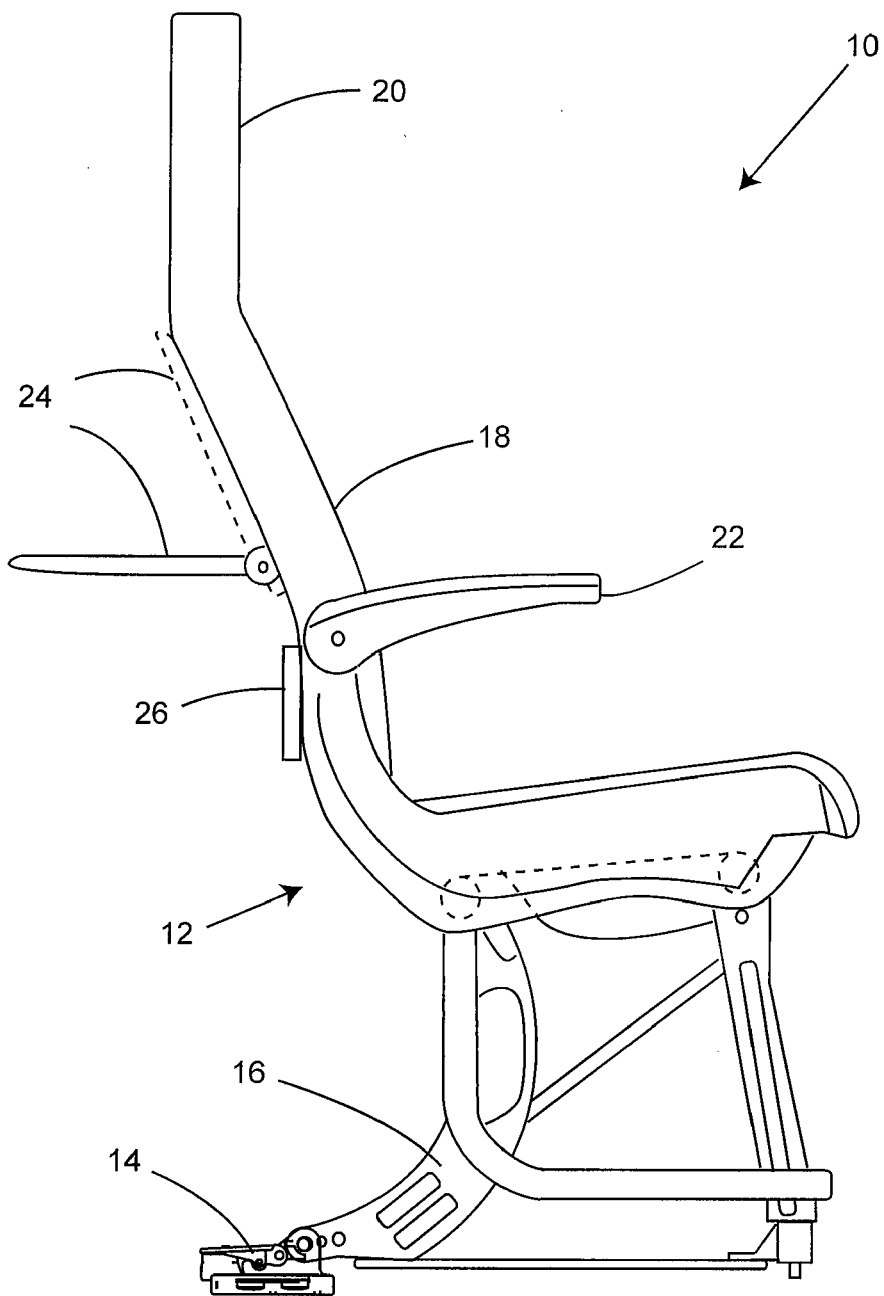
FIG. 1 is a side view of an improved seating apparatus for an aircraft constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing a preferred embodiment of the inventions and are not intended to limit the inventions thereto. As best seen in FIG. 1, an improved seating apparatus for an aircraft, generally designated 10, is shown constructed according to the present invention. The improved seating apparatus 10 includes a seat assembly 12 and a quick install track fitting assembly 14 for securing the seat assembly 12 to an aircraft. The seat assembly 12 includes a seat leg 16, a seat back 18, a headrest 20, an armrest 22, a serving tray 24 and literature box 26.

Figure 2:
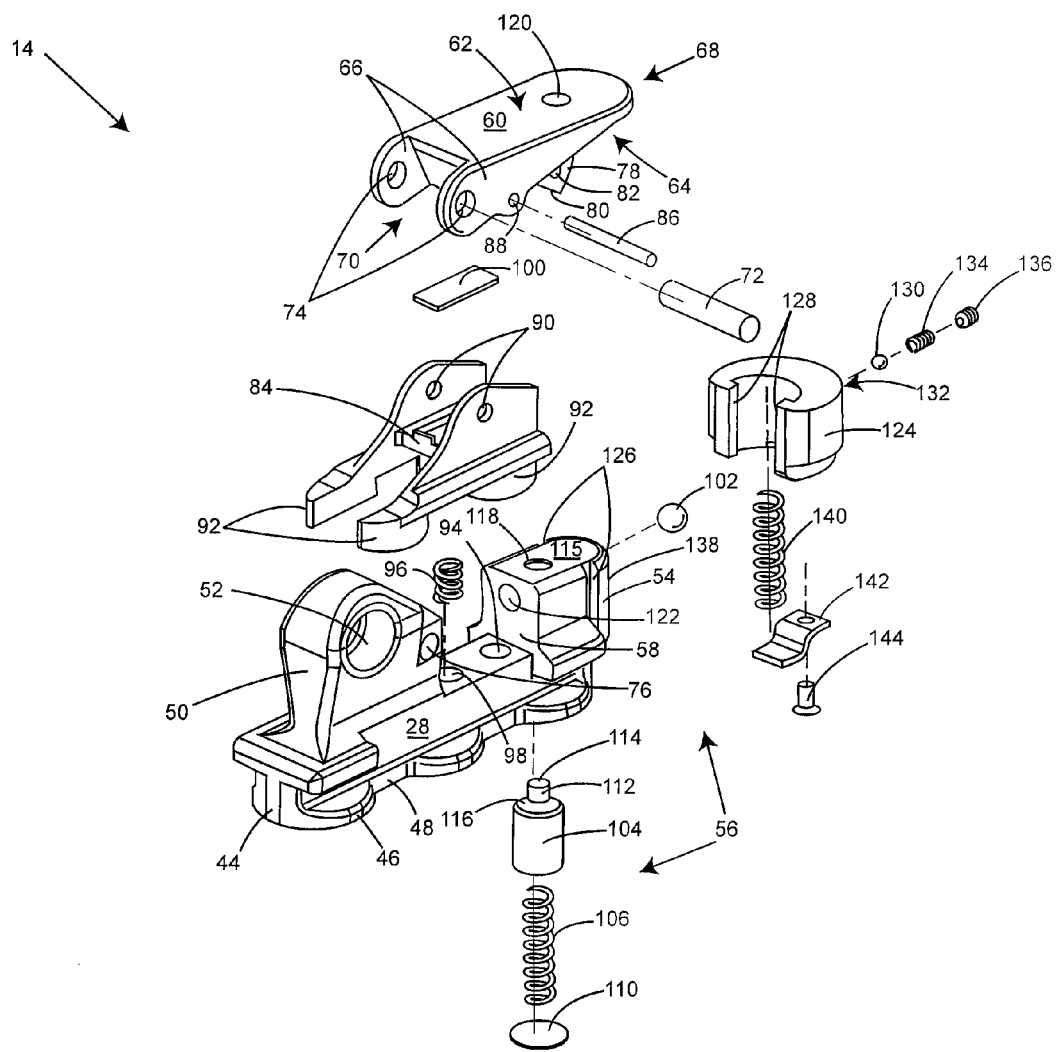
FIG. 2 is an exploded perspective view of a quick install track fitting assembly for securing a seat assembly to an aircraft.

FIG. 2 is an exploded perspective view of the quick install track fitting assembly 14 for securing the seat assembly 12 to an aircraft. When the track fitting assembly 14 is attached to the seat assembly, the track fitting assembly 14 extends trackwardly from the seat assembly 12.

Figure 3:
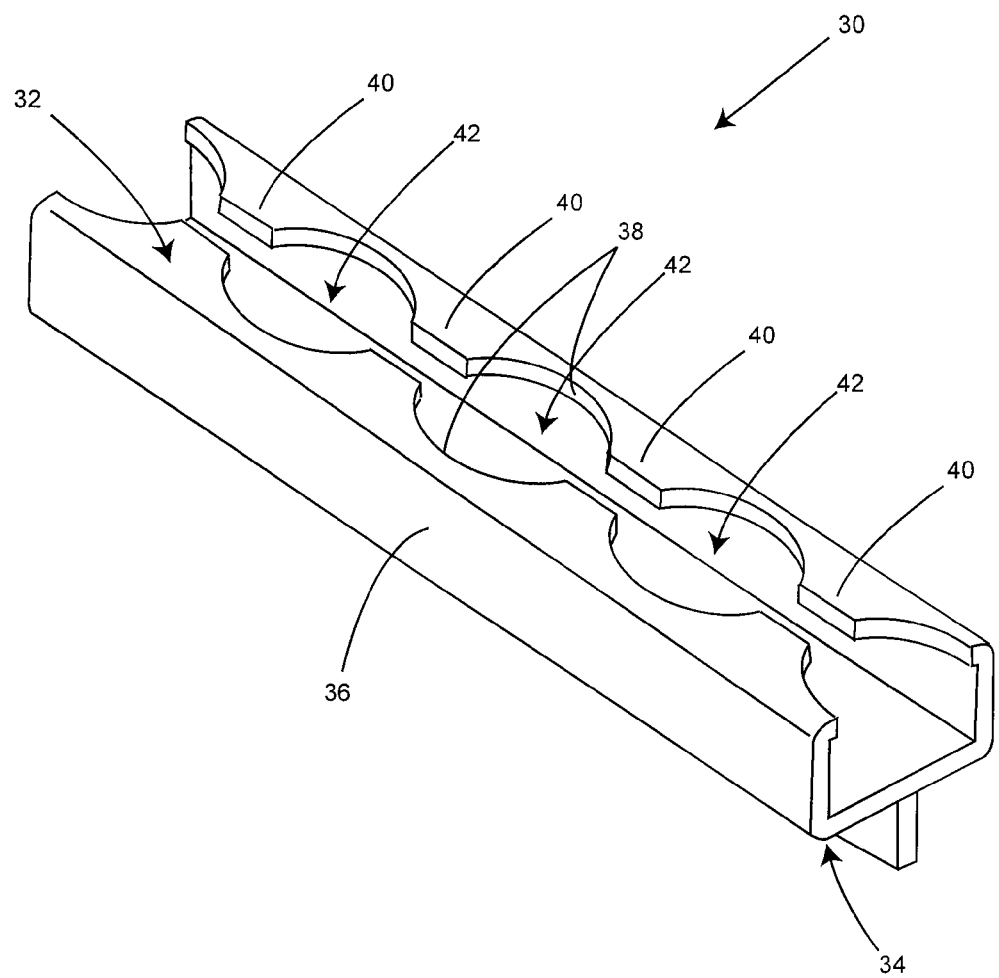
FIG. 3 is a cross-sectional perspective view of a seat track for an aircraft.

The track fitting assembly 14 includes a track fitting body 28 for insertion into an aircraft seat track 30 such as shown in FIG. 3. Aircraft seat track 30 includes a top 32, a bottom 34 and at least one side 36. The track top 32 includes opposing track edges 38 that define a longitudinal slot for retaining the track fitting body 28. The distance between the opposing track edges 38 changes along at least a portion of the track 30 to define slot segments 40 and enlarged openings 42.

The track fitting body 28 includes a bottom section 44 having at least one head portion 46 that may pass through the enlarged openings 42 along with at least one neck portion 48 that may pass though the openings between the slot segments 40. The track fitting body 28 further includes forward section having an anchor portion 50 that includes a generally cylindrical wall 52 defining a hole or eye for securing a seat leg. Moreover, the track fitting body 28 further includes a rear section 54 for housing a track locking means, generally 56. The rear section 54 also has a forward facing surface 58 that extends perpendicularly upward from the bottom section 44 of the track fitting body 28.

A manual lever 60 having a top 62, a bottom 64, sides 66 and a proximal end 68 and a distal end 70 is pivotably attached to the track fitting body 28 by a first pin 72 that inserts through a first pair of aligned holes 74 at one end of the lever 60 and an aperture 76 through the anchor portion 50 of the track fitting body 28. Preferably, the aperture 76 is generally located behind and just below the anchor portion cylindrical wall 52. Moreover, the lever 60 includes a locking plate 78 with tip 80 and locking detent 82 that is a preferred member of the locking means 56. The locking plate 78 extends generally perpendicular from the bottom 64 of the manual lever 60.

Figure 4:
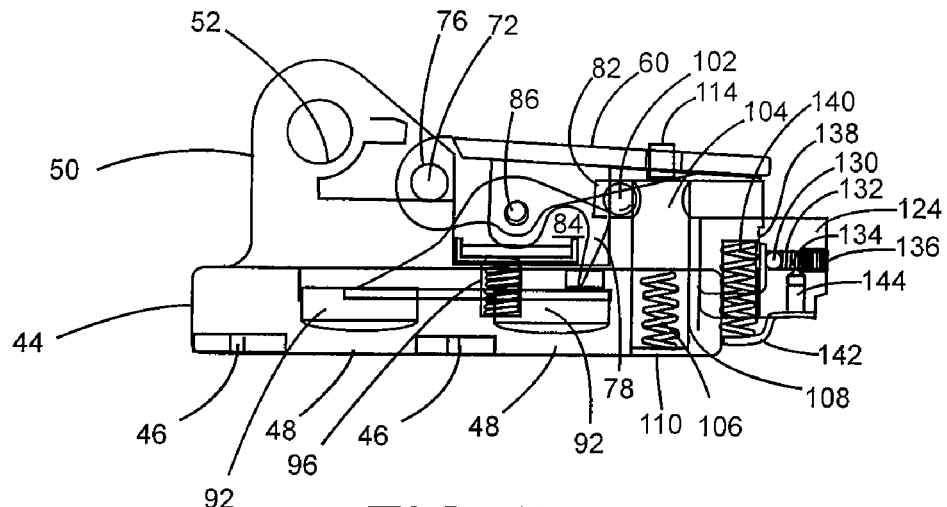
FIG. 4 is a side sectional view of the quick install track fitting assembly of FIG. 2 shown in the track lock position.

A force-bearing plunger 84 is movably attached to the manual lever 60 by a second pin 86 inserted through a second pair of aligned holes 88 in the lever 60 and a third larger size pair of aligned holes 90 in the force-bearing plunger 84. The force-bearing plunger 84 includes feet 92 for transferring force to the aircraft seat track 30 depicted in FIG. 3. The locking means 56 maintains the force-bearing plunger 84 in a track lock position when the manual lever is in a lever lock position as shown in FIG. 4. A pivot plate tip receptacle 94 located near the rear section 54 of track fitting body 28 receives the locking plate tip 80 when lever 60 is in its lever lock position. A compression release spring 96 nested within a recess 98 within the general center of bottom section 44 of track fitting body 28 is for applying force to the force bearing plunger 84 towards its release position. FIG. 4 shows the compression release spring 96 in its compressed state. Moreover, a leaf spring 100 sandwiched between the bottom 64 of the manual lever 60 and the force bearing plunger 84 is for deflecting and applying force against force bearing plunger 84 to eliminate rattling when the manual lever 60 is in its locked position.

The locking means 56 of the preferred embodiment further includes a locking ball 102 and a locking piston 104 with a compression piston spring 106. A vertical cylindrical piston wall 108 defining a cavity within a rearward portion of the track fitting body 28 houses the compression piston spring 106 and locking piston 104. A bottom cap 110 retains the piston spring 106 and the locking piston 104 within the piston cylindrical wall 108.

The locking piston 104 has a reduced diameter head portion 112 that includes a lock indicator flag 114. A uniform shoulder 116 exists between the reduced diameter head portion and the remainder of the piston 104. The shoulder 116 has a slight downward and outwardly radial slope. The rear section 54 of the track fitting body 28 and the manual lever 60 both include flag indicator ports 118 and 120 that align such that the lock indicator flag 114 is visible when the manual lever 60 is in its lever lock position. The top surface 115 of rear section 54 of the track fitting body 28 has a contrasting color such as red, to function as a second indicator 115 to show when the track fitting assembly 14 is in the release position. A first tunnel 122 for the locking ball 102 extends from the forward facing surface 58 of the track fitting body 28 rear section 54 into and through the vertical cylindrical piston wall 108 and 54. It is preferred for tunnel 122 to extend all the way through to the outside of rear section 54, such that a small diameter tool may be inserted into tunnel 122 to depress piston 104 from its shoulder 116 to allow the locking ball 102 to roll back on the piston shoulder 116. In this way, the locking ball 102 is free from the detent 82, thereby allowing compression release spring 96 to push force-bearing plunger 84 and lever 60 to their release positions.

Figure 5:
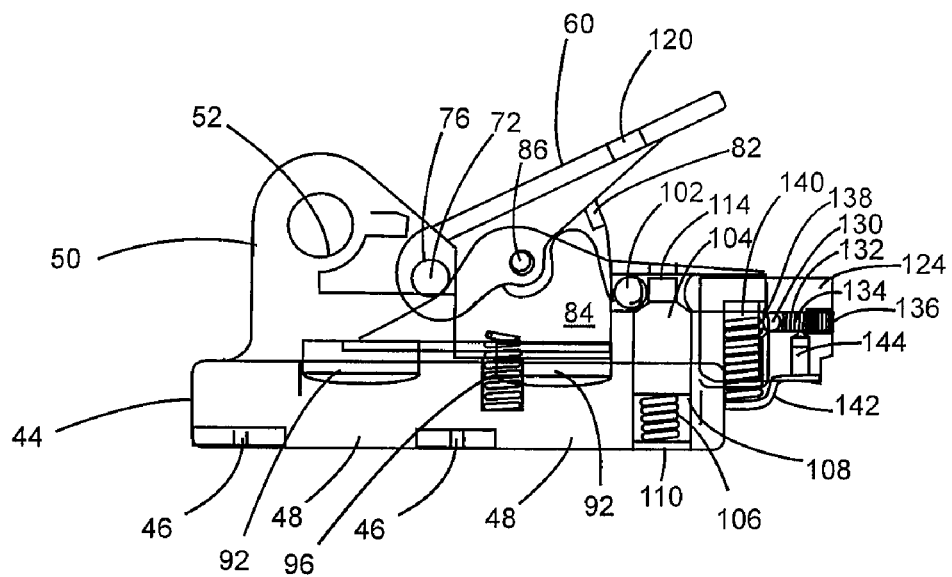
FIG. 5 is a side sectional view of the quick install track fitting assembly of FIG. 2 shown in the track release position.

As shown in FIGS. 2, 4 and 5, a secondary plunger 124 attaches to the rear section 54 of track fitting body 28 by way of tongue and groove tracks 126 and tongue sliders 128 that are slidable within the tongue and groove tracks 126. The tongue and groove tracks 126 are arranged on opposite sides of the rear section 54 of the track fitting body 28. A secondary locking ball 130 fits within a second tunnel 132 that extends through the secondary plunger 124. The secondary locking ball 130 is urged against the rear section 54 of track fitting body 28 by a locking ball compression spring 134, which in turn is held within second tunnel 132 by a detent adjustment screw 136. A secondary detent 138 for engaging secondary locking ball 130 is located in an upper portion of rear section 54. Secondary plunger 124 is biased downward by a secondary compression spring 140, which in turn is held against track fitting body 28 by a retainer bracket 142 that is fastened to secondary plunger 124 by a fastener 144.

The secondary plunger 124 is spring loaded by the compression spring 140 when depressed by an installer's foot at a location close to the desired locking position of seat assembly 12. This action is taken to locate the attached seat assembly 12 in a proper locking position to allow for force bearing plunger 84 to engage and lock into the seat track 30 shown in FIG. 3. Moreover, secondary plunger 124 is useable as a secondary locking device to prevent the seat assembly 12 from dislodging while the lever 60 is in its release position.

While in the lever release position shown in FIG. 5, the locking ball 102 rests both against the shoulder 116 of the piston 104 and against the locking plate tip 80. In this position, the locking ball 102 presses down on the piston shoulder 116 such that the compression piston spring 106 is fully compressed resulting in the lock indicator flag 114 being retracted from view. Moreover, secondary plunger 124 is urged into a lock position by the compression spring 134. Secondary locking ball 130 is forced out of secondary detent 138 when secondary plunger 124 is in its spring loaded lock position.

In contrast, while in the lever lock position as shown in FIG. 4, the locking ball 102 rests within the locking plate detent 82, allowing the compression piston spring 106 to push the locking piston 104 upward such that the lock indicator flag 114 is visible through the indicator flag ports 118 and 120, respectively. Moreover, secondary plunger 124 is locked in its release position by the secondary locking ball 130 engagement of secondary detent 138, which is biased into the detent 138 by the compression spring 134. Compression spring 140 is fully compressed when secondary plunger 124 is in its release position.

In operation, the seat assembly 12 with attached quick install track fitting assembly 14 is positioned over the seat track 30 such that the track fitting body 28 is aligned trackwardly with the lever 60 in its lever release position as shown in FIG. 5. When the seat assembly 12 is maneuvered close to the desired locking position, secondary plunger 124 is depressed and released. This action locates a proper locking position wherein the at least one head portion 46 and at least one neck portion 48 of the track fitting body 28 passes through the enlarged openings 42 and the openings between the slot segments 40. In this way, the seat assembly 12 is moved within the track 30 such that plunger 84's feet 92 align with enlarged track openings 42. At this point, the lever 60 is manually urged into its lever lock position. As the lever 60 moves towards it lever lock position, the force-bearing plunger 84 is urged towards its track lock position. As the plunger 84's feet press against the top 32 of track 30, at least one head portion 46 engages the undersides of the track slot segments 40, thereby fastening the seat assembly 12 to the track 30. Due to the variance in track top thickness, the leaf spring 100 will deflect to adjust for track thickness, and provides anti-rattling friction between plunger 84 and track top 32.

In order to release the quick install track fitting assembly 14 from the seat track 30, a technician takes a small diameter tool and inserts it into tunnel 122 to depress piston 104 from its shoulder 116 to allow the locking ball 102 to roll back on the piston shoulder 116. In this way, the locking ball 102 is free from the detent 82, thereby allowing compression release spring 96 to push force-bearing plunger 84 and lever 60 to their release positions. Alternately, the technician may use a small diameter tool to depress piston 104 by inserting a tip of the small diameter tool through ports 120 and 118 that leads to the reduced diameter head portion 112 of piston 104. In this way, piston 104 is depressed, which allows the locking ball 102 to roll back on the piston shoulder 116, thereby allowing compression release spring 96 to push force-bearing plunger 84 and lever 60 to their release positions. The piston depression tool may be a screw driver or other small diameter rod-like device. A suitable piston depression tool may have a diameter of thirty-thousandths of an inch.

Figure 6:
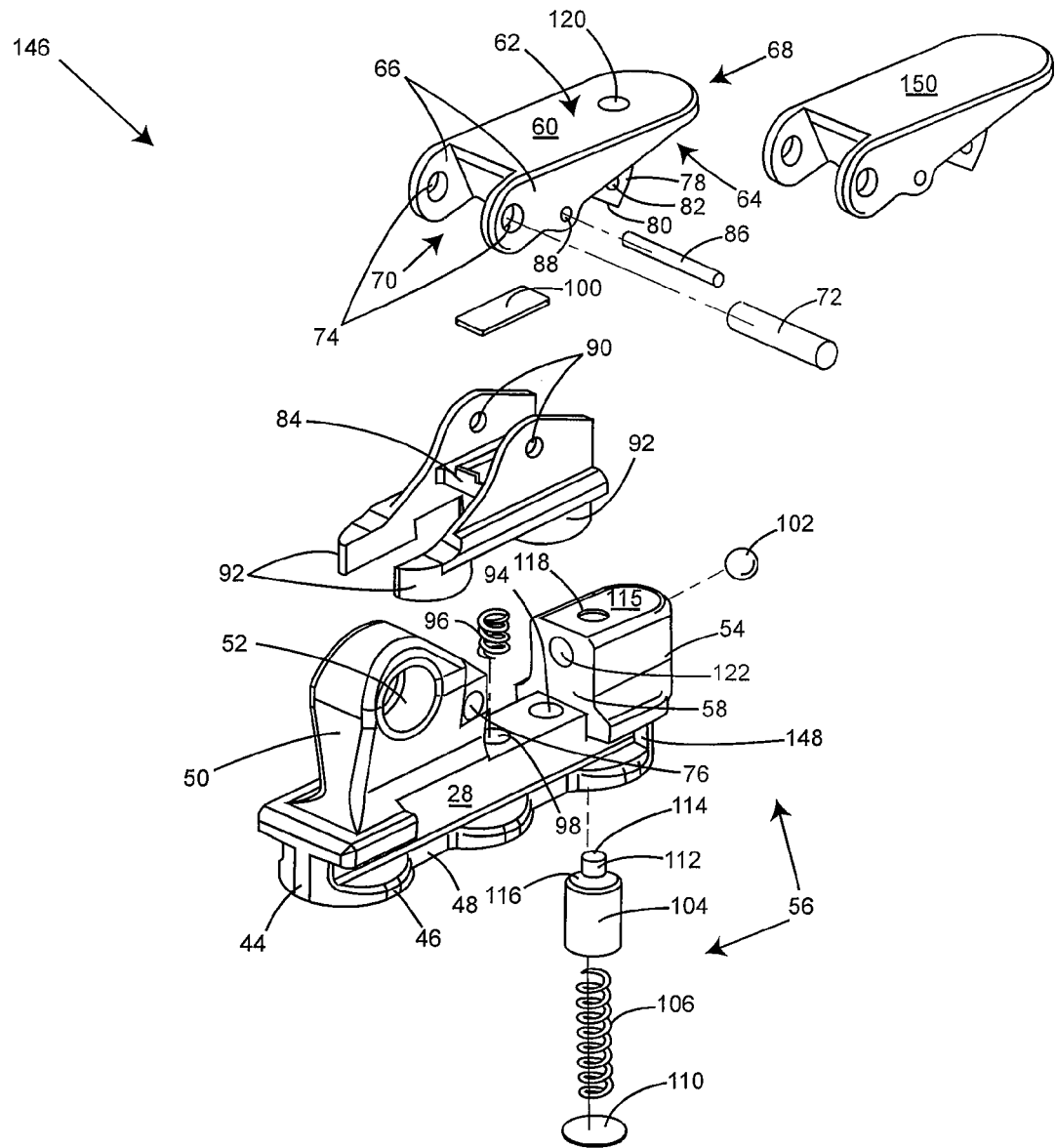
FIG. 6 is an exploded perspective view of another embodiment quick install track fitting assembly for securing a seat assembly to an aircraft.

FIG. 6 illustrates another embodiment of the present invention, which is a track fitting assembly 146 that does not incorporate a secondary plunger. Instead, this embodiment includes a seat locator and stop-portion 148 that extends upwardly from the head portion 46 located nearest to the rear section 54 of track fitting body 28. Stop-portion 148 is for engaging slot segments 40 of aircraft seat track 30 shown in FIG. 3. The engagement between stop-portion 148 and a slot segment 40 locates a proper seat position and stops any forward motion of track fitting body 28 as the force-bearing plunger 84 is urged into its track lock position. Stop-portion 148 may be integral with track fitting body 28.

FIG. 6 also depicts an optional manual lever 150 that may be used in place of manual lever 60. The only difference between the two manual levers is that manual lever 60 does include a port for a small diameter tool for depressing piston 104. When manual lever 150 is used in place of manual lever 60, the quick install track fitting assembly 146 is released from seat track 30 by taking a small diameter tool and inserting it into tunnel 122 to depress piston 104 from its shoulder 116 to allow the locking ball 102 to roll back on the piston shoulder 116. In this way, the locking ball 102 is free from the detent 82, thereby allowing compression release spring 96 to push force-bearing plunger 84 and lever 60 to their release positions.

Certain modifications and improvements will occur to those skilled in the art, upon a reading of the foregoing description. For example, the track fitting body and plunger are preferably made of steel, but other metal alloys may be used. The manual lever, for instance, is preferably made from a high alloy aluminum. Moreover, the seat assembly may be stopped against the reduced section of the track top via a stop on the track fitting body. In this case, the secondary plunger is not required. All such modifications and improvements have been deleted herein for the sake of conciseness and readability, but are properly within the scope of the following claims.

What is claimed is:

1. An improved seating apparatus for an aircraft comprising:
   (a) a seat assembly; and
   (b) a quick install aircraft fitting assembly for securing said seat assembly to the aircraft including: (i) a track fitting body for insertion into an aircraft seat track, said aircraft seat track including enlarged track openings; (ii) a manual lever being pivotably attached to said track fitting body, said manual lever having a lever release position and a lever lock position; (iii) a force bearing plunger movably attached to said manual lever for transferring force to the aircraft seat track, said force bearing plunger including feet adapted for alignment with the enlarged track openings and pressing against said aircraft seat track, and said force bearing plunger having a track release position and a track lock position; (iv) a leaf spring sandwiched between said manual lever and said force bearing plunger; and (v) a locking means for maintaining said plunger in said track lock position when said manual lever is in said lever lock position.

2. The improved seating apparatus of claim 1, wherein said locking means includes: (a) a locking piston; (b) a cylindrical piston wall in the rear portion of said track fitting body for housing said locking piston; (c) a compression spring for biasing said locking piston; and (d) a locking ball for urging the piston to compress said compression piston spring.

3. The improved seating apparatus of claim 2, further including a locking plate with detent for capturing said locking ball when said manual lever is in said lock position.

4. The improved seating apparatus of claim 2, wherein said locking piston has a reduced head portion.

5. The improved seating apparatus of claim 4, further including an indicator flag on said reduced head portion.

6. The improved seating apparatus of claim 5, wherein said rear portion of said track fitting body has an indicator flag port centered over said locking piston.

7. The improved seating apparatus of claim 6, wherein said manual lever includes an indicator flag port that aligns with said track fitting body indicator flag port when said manual lever is in said lever lock position.

8. The improved seating apparatus of claim 1, further including a seat track for engaging said track fitting body.

9. The improved seating apparatus of claim 8, wherein said track includes a top, bottom, and at least one side for retaining said track fitting body.

10. The improved seating apparatus of claim 9, wherein said top of the track includes opposing edges generally parallel to said at least one side.

11. The improved seating apparatus of claim 10, wherein the distance between the opposing edges changes at least along a portion of said track.

12. The improved seating apparatus of claim 11, wherein said track fitting body includes a head portion.

13. The improved seating apparatus of claim 12, wherein said track fitting body includes a neck portion.

14. The improved seating apparatus of claim 13, wherein said head portion of said track fitting body is larger than said neck portion of said track fitting body when measured transverse the track fitting body.

15. The improved seating apparatus of claim 1, further including a secondary plunger to locate said seat assembly in a proper locking position into said aircraft seat track.

16. The improved seating apparatus of claim 15, wherein said secondary plunger is spring loaded to be urged towards a lock position.

17. The improved seating apparatus of claim 16, further includes a secondary locking ball and compression spring.

18. The improved seating apparatus of claim 17, wherein said track fitting body includes a detent for receiving said secondary locking ball.

19. The improved seating apparatus of claim 15, wherein said track fitting body further includes tongue and groove tracks and wherein said secondary plunger further includes tongues for engaging said tongue and groove tracks.

20. A quick install aircraft track fitting assembly comprising:
   (a) a track fitting body for insertion into an aircraft seat track, said aircraft seat track including enlarged track openings;
   (b) a manual lever being pivotably attached to said track fitting body, said manual lever having a lever release position and a lever lock position;
   (c) a force bearing plunger movably attached to said manual lever for transferring force to said aircraft seat track, said force bearing plunger including feet adapted for alignment with the enlarged track openings and pressing against said aircraft seat track, and said force bearing plunger having a track release position and a track lock position;
   (d) a leaf spring sandwiched between said manual lever and said force bearing plunger; and
   (e) a locking means for maintaining said plunger in said track lock position when said manual lever is in said lever lock position.

21. The quick install aircraft track fitting assembly of claim 20, wherein said locking means includes: (a) a locking piston; (b) a cylindrical piston wall in a rear portion of said track fitting body for housing said locking piston; (c) a compression spring for biasing said locking piston; and (d) a locking ball for urging said piston to compress said compression piston spring.

22. The quick install aircraft track fitting assembly of claim 21, further including a locking plate with detent for capturing said locking ball when said manual lever is in said lock position.

23. The quick install aircraft track fitting assembly of claim 22, wherein said locking piston has a reduced head portion.

24. The quick install aircraft track fitting assembly of claim 23, further including an indicator flag on said reduced head portion.

25. The quick install aircraft track fitting assembly of claim 24, wherein said rear portion of said track fitting body has an indicator flag port centered over said locking piston.

26. The quick install aircraft track fitting assembly of claim 25, wherein said manual lever includes an indicator flag port that aligns with said track fitting body indicator flag port when said manual lever is in said lever lock position.

27. The quick install aircraft track fitting assembly of claim 25, wherein said manual lever exposes a contrast color on a top surface of the rear portion of said track fitting body when said manual lever is in said track release position.

28. The quick install aircraft track fitting assembly of claim 20, further including a seat track for engaging said track fitting body.

29. The quick install aircraft track fitting assembly of claim 28, wherein said track includes a top, bottom and at least one side for retaining said track fitting body.

30. The quick install aircraft track fitting assembly of claim 29, wherein the top of the track includes opposing edges generally parallel to said at least one side.

31. The quick install aircraft track fitting assembly of claim 30, wherein the distance between the opposing edges changes at least along a portion of the track.

32. The quick install aircraft track fitting assembly of claim 30, wherein said track fitting body includes a head portion and a neck portion, wherein said head portion of the track fitting body is larger than said neck portion of said track fitting body when measured transverse said track fitting body.

33. A quick install aircraft track fitting assembly comprising:
 (a) a track fitting body for insertion into an aircraft seat track, said aircraft seat track including enlarged track openings, and wherein said track fitting body includes a rear section, a head portion and a neck portion, and wherein said head portion of the track fitting body is larger than said neck portion of said track fitting body when measured transverse said track fitting body;
 (b) a stop-portion extending upwardly from said head portion near said rear section of said track fitting body;
 (c) a manual lever being pivotably attached to said track fitting body, said manual lever having a lever release position and a lever lock position;
 (d) a force bearing plunger movably attached to said manual lever for transferring force to said aircraft seat track, said force bearing plunger including feet adapted for alignment with the enlarged track openings and pressing against said aircraft seat track, and said force bearing plunger having a track release position and a track lock position;
 (e) a leaf spring sandwiched between said manual lever and said force bearing plunger; and
 (f) a locking means for maintaining said plunger in said track lock position when said manual lever is in said lever lock position.

34. An improved seat seating apparatus for an aircraft comprising:
 (a) a seat assembly; and
 (b) a quick install aircraft fitting assembly for securing said seat assembly to the aircraft including: (i) a track fitting body for insertion into an aircraft seat track, said aircraft seat track including enlarged track openings; (ii) a manual lever being pivotably attached to said track fitting body, said manual lever having a lever release position and a lever lock position; (iii) a force bearing plunger movably attached to said manual lever for transferring force to the aircraft seat track, said force bearing plunger including feet adapted for alignment with the enlarged track openings and pressing against said aircraft seat track, and said force bearing plunger having a track release position and a track lock position; (iv) a leaf spring sandwiched between said manual lever and said force bearing plunger; (v) a locking means for maintaining said plunger in said track lock position when said manual lever is in said lever lock position; (vi) a first visual indicator for indicating the status of a track lock position; and (vii) a second visual indicator for indicating the status of said track release position.

35. The improved seating apparatus of claim 34, wherein said locking means includes: (a) a locking piston; (b) a cylindrical piston wall in the rear portion of said track fitting body for housing said locking piston; (c) a compression spring for biasing said locking piston; and (d) a locking ball for urging the piston to compress said compression piston spring.

36. The improved seating apparatus of claim 35, further including a locking plate with detent for capturing said locking ball when said manual lever is in said lock position.

37. The improved seating apparatus of claim 35, wherein said locking piston has a reduced head portion.

38. The improved seating apparatus of claim 37, wherein said visual indicator is an indicator flag on said reduced head portion.

39. The improved seating apparatus of claim 38, wherein said rear portion of said track fitting body has an indicator flag port centered over said locking piston.

40. The improved seating apparatus of claim 39, wherein said manual lever includes an indicator flag port that aligns with said track fitting body indicator flag port when said manual lever is in said lever lock position.

41. The improved seating apparatus of claim 34, further including a seat track for engaging said track fitting body.

42. The improved seating apparatus of claim 41, wherein said track includes a top, bottom, and at least one side for retaining said track fitting body.

43. The improved seating apparatus of claim 42, wherein the top of the track includes opposing edges generally parallel to said at least one side.

44. The improved seating apparatus of claim 43, wherein the distance between the opposing edges changes at least along a portion of the track.

45. The improved seating apparatus of claim 44, wherein the track fitting body includes a head portion.

46. The improved seating apparatus of claim 45, wherein the track fitting body includes a neck portion.

47. The improved seating apparatus of claim 46, wherein said head portion of said track fitting body is larger than said neck portion of said track fitting body when measured transverse said track fitting body.

48. The improved seating apparatus of claim 34, further including a secondary plunger to locate said seat assembly in a proper locking position into said aircraft seat track.

49. The improved seating apparatus of claim 48, wherein said secondary plunger is spring loaded to be urged towards a lock position.

50. The improved seating apparatus of claim 49 further includes a secondary locking ball and compression spring.

51. The improved seating apparatus of claim 50, wherein said track fitting body includes a detent for receiving said secondary locking ball.

52. The improved seating apparatus of claim 51, wherein said track fitting body further includes tongue and groove tracks and wherein said secondary plunger further includes tongues for engaging said tongue and groove tracks.

* * * * *